United States Patent [19]

Keen

[11] Patent Number: 5,638,438
[45] Date of Patent: Jun. 10, 1997

[54] SYSTEM AND METHOD FOR AUTOMATICALLY CREATING NEW PAGES IN A TOUCH SCREEN BASED TELEPHONY PRODUCT HAVING A HIERARCHICAL REPERTORY

[75] Inventor: Donald M. Keen, Indianapolis, Ind.

[73] Assignee: Lucent Technologies Inc., Murray Hill, N.J.

[21] Appl. No.: 648,850

[22] Filed: May 16, 1996

Related U.S. Application Data

[63] Continuation of Ser. No. 262,810, Jun. 20, 1994, abandoned.
[51] Int. Cl.$^6$ .................... G06F 3/14; G06F 7/08
[52] U.S. Cl. .................... 379/354; 395/348; 379/91
[58] Field of Search .................... 379/354, 355, 379/396, 210, 216

[56] References Cited

U.S. PATENT DOCUMENTS

| | | | |
|---|---|---|---|
| 4,453,040 | 6/1984 | Wolf | 379/355 |
| 4,653,086 | 3/1987 | Laube | 379/96 |
| 4,862,498 | 8/1989 | Reed | 379/355 |
| 5,065,347 | 11/1991 | Pajak | 395/159 |
| 5,393,964 | 2/1995 | Hamilton | 379/91 |

*Primary Examiner*—Krista M. Zele
*Assistant Examiner*—Thomas F. Presson

[57] ABSTRACT

Automatic expansion of a hierarchical repertory that is maintained by a touch screen based product to accommodate a user request to add an entry to a touch screen display page that has reached its capacity of entries is discussed. Such automatic expansion operates by selecting a button from the display page, wherein the selected button is linked to a first node of the repertory. A second node is added to the repertory, and the repertory is modified to establish the first node as a child node of the second node. Then, a new menu button is associated with the second node, and the selected button is deleted from the display page. The new menu button is positioned in the display page at the position previously occupied by the selected button.

13 Claims, 7 Drawing Sheets

SYSTEM AND METHOD FOR AUTOMATICALLY CREATING NEW PAGES IN A TOUCH SCREEN BASED TELEPHONY PRODUCT HAVING A HIERARCHICAL REPERTORY

This is a Continuation of application Ser. No. 08/262,810 filed Jun. 20, 1994, now abandoned.

BACKGROUND OF THE INVENTION

1. Field of the Invention

The present invention relates generally to touch screen based telephony products, and more particularly to a touch screen based telephony product wherein new pages are automatically created in a hierarchical repertory of telephone numbers.

2. Related Art

Touch screen technology is being integrated into many types of electronic products. For example, touch screen technology is being integrated with some telephony products, such as a telephone having a touch screen for accepting user input.

A touch screen based telephone typically includes a hierarchical repertory of telephone numbers. These telephone numbers, which are stored in a memory located within the telephone, can be automatically dialed by pressing appropriate "buttons" on the telephone's touch screen display.

Figure 3:
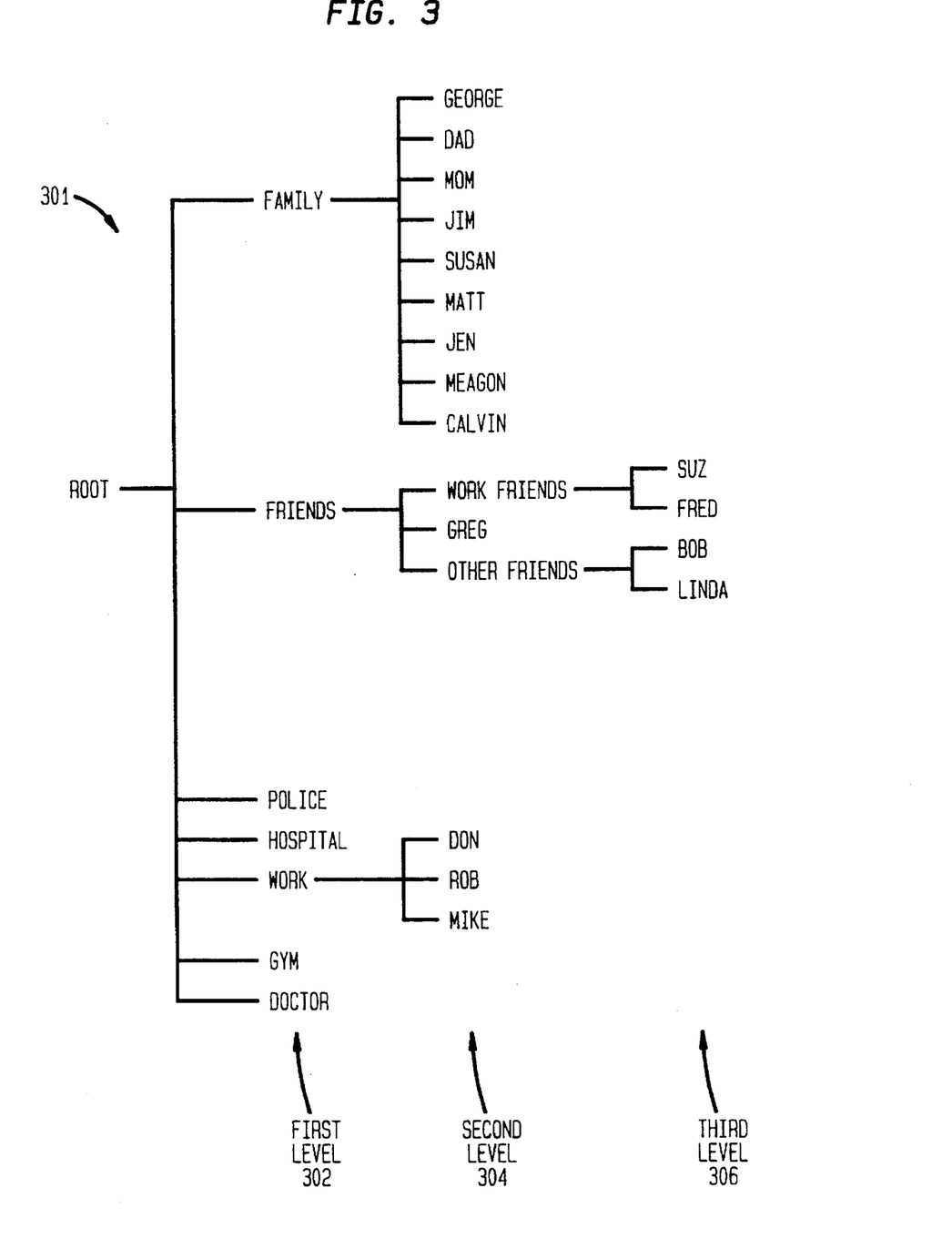
FIG. 3 is a hierarchical repertory associated with the display pages of FIGS. 1 and 2.

The telephone numbers in the repertory are hierarchically organized. FIG. 3 is an example three level hierarchical repertory 301 of telephone numbers. The hierarchical repertory 301 may be implemented using any well known and appropriate data structure, such as a linked list data structure. The hierarchical repertory 301 includes a plurality of nodes anchored by a root node. Each node may have one or more "child" nodes. For example, the "root" node has the following child nodes: "family", "friends", "police", "hospital", "work", "gym", and "doctor". These nodes are in a first level 302 from the root node of the hierarchical repertory 301.

Some of the nodes (called "parent nodes") in the first level 302 have child nodes, such as the "family" node which has the following child nodes in a second level 304 of the repertory 301: "George", "Dad", "Mom", "Dad", "Jim", "Susan", "Matt", "Jen", "Meagan", and "Calvin". Some of these nodes in the second level 304 have child nodes, such as a "work friends" node which has the following child nodes in a third level 306 of the repertory: "Suz" and "Fred".

Nodes in the hierarchical repertory 301 which do not have child nodes (called "non-parent nodes"; non-parent nodes include the "police" node in the first level 302 and the "Jen" node in the second level 304) correspond to telephone numbers. For example, the "police" node corresponds to the telephone number of the police, and the "Jen" node corresponds to Jen's telephone number. These telephone numbers are stored in a memory inside the telephone.

A user navigates through a touch screen based telephone's hierarchical repertory using a series of display pages that are displayed on the telephone's touch screen. Each of these display pages includes one or more "fast dial" buttons which map to the nodes in the hierarchical repertory. A user presses these fast dial buttons to automatically dial telephone numbers from the hierarchical repertory.

Figure 1:
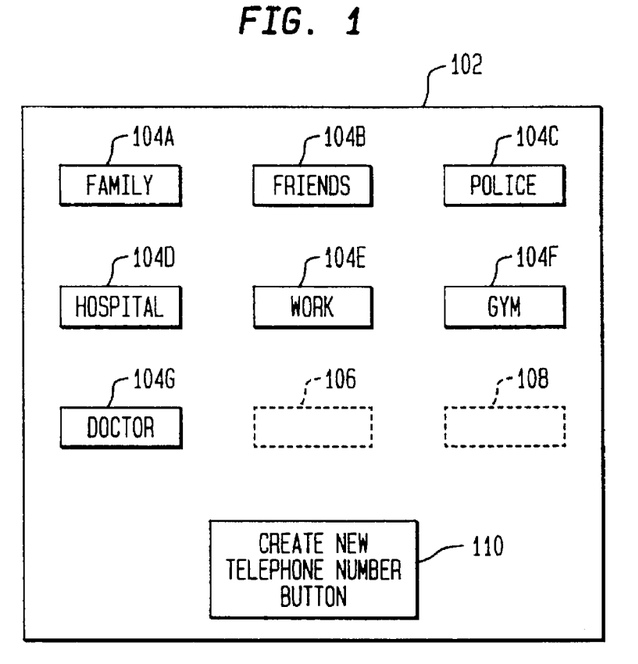
FIGS. 1 and 2 are display pages displayed by a touch screen based telephone.

FIG. 1 is an example display page 102 that corresponds to the first level 302 of the hierarchical repertory 301 of FIG. 3. The display page 102 includes fast dial buttons 104.

The fast dial buttons in any particular display page correspond to all of the child nodes of a particular parent node in the hierarchical repertory. For example, the fast dial buttons 104 in the display page 102 correspond to all of the child nodes (in the first level 302) of the "root" node in the hierarchical repertory 301.

Each display page provided by the touch screen based telephone can accommodate only a predetermined number of fast dial buttons. For example, the display page 102 can each accommodate up to a maximum of nine fast dial buttons (this is also true of the display page 202 in FIG. 2, described below). This display page limitation also limits the structure of the hierarchical repertory. Specifically, the maximum number of child nodes that any particular parent node in the hierarchical repertory can have is equal to the maximum number of buttons that can be in any particular display page, and vice versa.

Each fast dial button 104 in the display page 102 of FIG. 1 is either a "telephone number" button 104C, 104D, 104F, 104G or a "menu" button 104A, 104B, 104E. A telephone number button 104C, 104D, 104F, 104G (also called herein "data button") is a button which corresponds to a non-parent node, that is, a node in the hierarchical repertory 301 that does not have any child nodes. In other words, a telephone number button 104C, 104D, 104F, 104G is a button which corresponds to a telephone number. When a user presses a telephone number button 104C, 104D, 104F, 104G, the telephone number associated with that button is automatically dialed. For example, the "police" button 104C corresponds to the "police" node shown in the first level 302 of the hierarchical repertory 301. When a user presses the "police" button 104C, the police telephone number associated with the "police" node is dialed.

Figure 2:
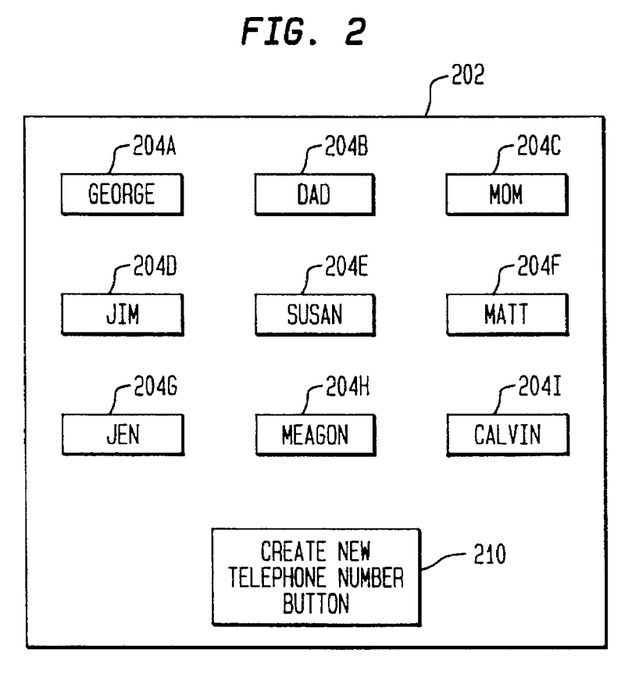

A menu button 104A, 104B, 104E is a button which corresponds to a parent node, that is, a node in the hierarchical repertory 301 that has one or more child nodes. When a user presses a menu button 104A, 104B, 104E, a new display page of fast dial buttons corresponding to the child nodes associated with that menu button 104A, 104B, 104E is displayed. For example, when a user presses a "family" menu button 104A, the display page 202 shown in FIG. 2 is displayed over the original display page 102. This display page 202 includes telephone number buttons 204A–204I which correspond to the children nodes (shown in the second level 304 of the hierarchical repertory 301) of the "family" node in the first level 302 of the hierarchical repertory 301.

In some conventional touch screen based telephones, the organization of the hierarchical repertory is predetermined and cannot be modified by users. In particular, the number of levels in the hierarchical repertory, the number of nodes in each of the levels, the lineage between nodes, and the display pages are predetermined and cannot be modified by users. These conventional touch screen based telephones are flawed because they do not provide users with the ability to create customized hierarchical repertories suited to their individual needs.

In other, more flexible conventional touch screen based telephones, the organization of the hierarchical repertory is not predetermined and can be modified by users. For example, the touch screen based telephone associated with the display pages 102 and 202 of FIGS. 1 and 2, respectively, provides this capability. Access to this capability is provided in part via a "create new telephone number button" button 110 that is shown in display page 102 of FIG. 1.

A user pushes this button 110 to create and add a new telephone number button to the fast dial buttons 104 that already exist in the display page 102. In other words, a user pushes this "create new telephone number button" button 110 to create and add a new non-parent node (that does not have any children nodes) to the hierarchical repertory 301. The manner in which nodes are added to the hierarchical repertory 301 will be apparent to persons skilled in the relevant art.

This new node is in the same level (i.e., the first level 302) of the hierarchical repertory 301 and has the same parent node (i.e., the root node) as the other nodes (i.e., the "family", "friends", "police", "hospital", "work", "gym", and "doctor" nodes) that correspond to the buttons 104 in the display page 102.

The new telephone number button which is created when the user presses the "create new telephone number button" button 110 must be positioned in the display page 102. As noted above, the display pages 102, 202 in FIGS. 1 and 2 can each accommodate up to a maximum of nine fast dial buttons. In the display page 102 of FIG. 1, seven fast dial buttons 104 exist. Thus, there are two available positions 106, 108 for new fast dial buttons. Accordingly, the new telephone number button which is created when the user presses the "create new telephone number button" button 110 is positioned in either position 106 or position 108 of the display page 102.

The display page 202 in FIG. 2 also has a "create new telephone number button" button 210. This button 210 in FIG. 2 is just like the "create new telephone number button" button 110 in FIG. 1, except that the new non-parent node that is created when button 210 is pressed is in the same level (i.e., the second level 304) of the hierarchical repertory 301 and has the same parent node (i.e., the "family" node in the first level 302) as the other nodes (i.e., the "George", "Dad", "Mom", "Dad", "Jim", "Susan", "Matt", "Jen", "Meagan", and "Calvin" nodes) that correspond to the buttons 204 in the display page 202.

In the example of FIG. 2, the display page 202 includes nine fast dial buttons 204. Thus, the display page 202 is "full" since it has reached its capacity of fast dial buttons. Since it is full, the display page 202 does not have any available positions for additional fast dial buttons. Accordingly, the "create new telephone number button" button 210 cannot be used to create a new telephone number button in the display page 202.

Conventional touch screen based telephones do not directly address this problem. In particular, conventional touch screen based telephones have no facilities for automatically accommodating a user's request to add a new telephone number button to a full display page. Instead, users must manually solve this problem.

In particular, a first solution to this problem requires that the user navigate to a display page that is not full, and then add the new telephone number button to that display page. For example, a user operating in display page 202 (which is full) must navigate to display page 102 (which is not full), and then add the new telephone number button to this display page 102. Positioning the new menu button in this manner, however, may conflict with the user's desired organization of the hierarchical repertory. Thus, this first solution is flawed since it may result in creating a hierarchical repertory that is illogically structured and, thus, less useful to the user. This first solution is further flawed since it is laborious from a user's point of view.

A second solution to this problem requires that the user create a new display page (the telephone number button which the user wants to create would be positioned in this new display page). The creation of a new display page operates to expand the hierarchical repertory. More particularly, the creation of a new display page operates to create in the hierarchical repertory a new parent node. Child nodes (such as the telephone number button which the user wants to create) may subsequently be created and connected to the new parent node.

The user must typically manually perform the following operations to create a new display page. First, the user typically must navigate to a display page that offers a "Create New Page" option, create a new page using this option, navigate to the newly created page, then create and add the new telephone number button to this newly created page. Also, the user must create a new menu button for the new page, and must position the new menu button in a display page (it may be necessary for the user to do this before creating the new page).

However, it is not possible for the user to position this new menu button in a display page that is full (such as display page 202). Instead, the user must navigate to a display page that is not full (such as display page 102), and position the new menu button in that display page. Alternatively, the user can manually delete an existing fast dial button from a full display page, and then manually place the new menu button in the position previously occupied by the deleted button.

Positioning the new menu button in this manner, however, may conflict with the user's desired organization of the hierarchical repertory. Thus, this second solution, like the first solution, is flawed since it may result in creating a hierarchical repertory that is illogically structured and, thus, less useful to the user. This second solution is further flawed since it is laborious from a user's point of view.

Thus, what is required is a system and method for automatically accommodating a user request to add a new telephone number button to a full display page of a hierarchical repertory maintained by a touch screen based telephone. More particularly, what is required is a system and method for automatically creating a new display page and expanding the hierarchical repertory for the purpose of accommodating such a user request.

SUMMARY OF THE INVENTION

The present invention is directed to a system and method for automatically expanding a hierarchical repertory that is maintained by a touch screen based product to accommodate a user request to add an entry to a touch screen display page that has reached its capacity of entries. The present invention operates by selecting a button from the display page, wherein the selected button is linked to a first node of the repertory. The present invention adds a second node to the repertory, and then modifies the repertory to establish the first node as a child node of the second node.

A new menu button is associated with the second node, and the selected button is deleted from the display page. Then, the new menu button is positioned in the display page at the position previously occupied by the selected button.

The present invention also operates to create a new display page, and associate a second new menu button with the first node. Then, the second new menu button is positioned in the new display page.

The present invention further operates to create a third node, associate user-provided data with the third node, modify the repertory to establish the third node as a child node of the second node, associate a new data button with the third node, and position the new data button (either automatically or in accordance with user input) in the new display page.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for automatically expanding a hierarchical repertory that is maintained by a touch screen based product to accommodate a user request to add an entry (such as a telephone number button) to a full touch screen display page. User data is preferably stored in the hierarchical repertory. The terms "repertory" and "database" are used interchangeably herein.

For convenience purposes, the present invention is described herein in terms of a touch screen based telephony product, such as a telephone. However, it should be understood that the present invention includes all types of touch screen based products which have a hierarchical database and display pages for navigating through and accessing data in the hierarchical database.

Figure 4:
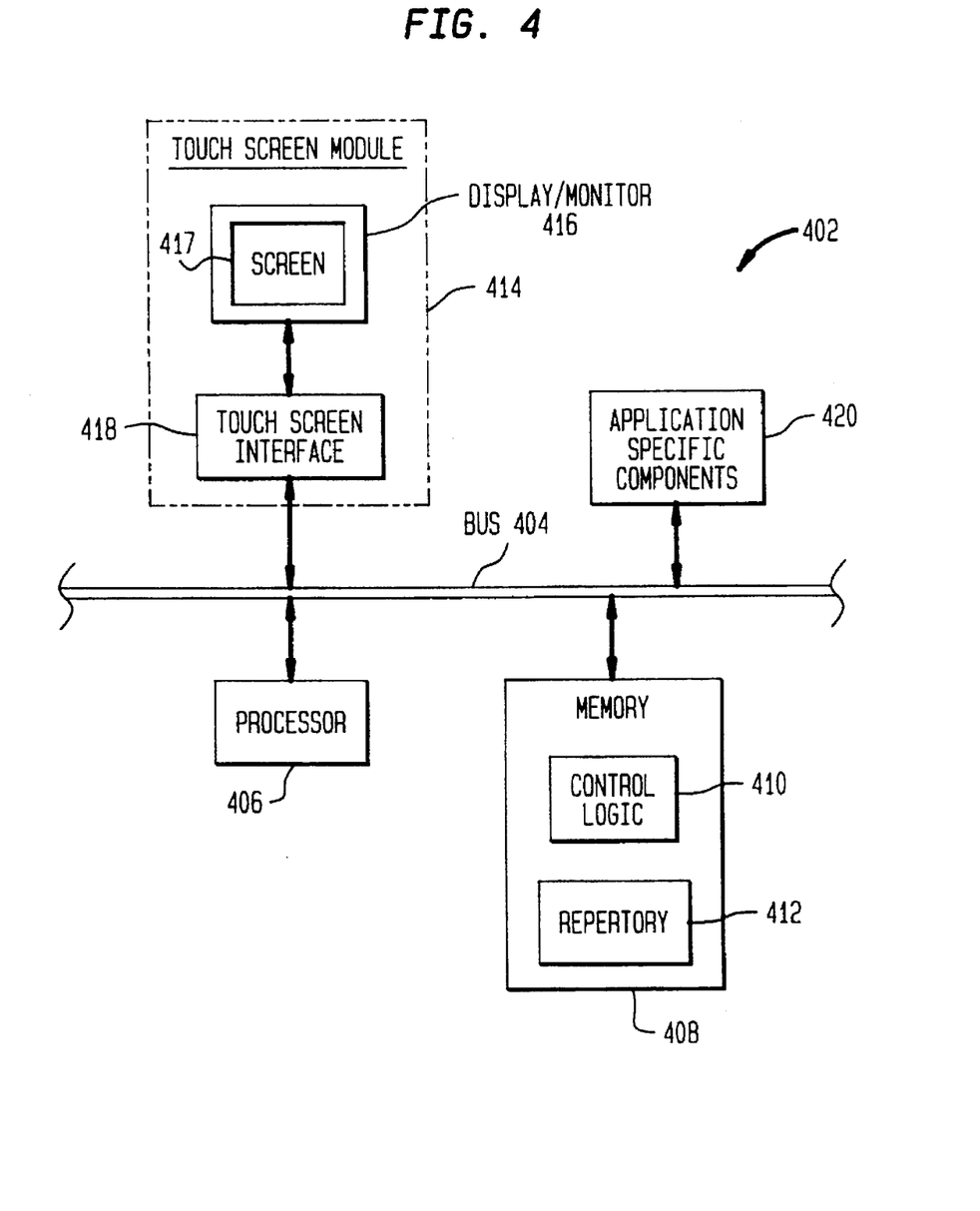
FIG. 4 is a block diagram of a touch screen based telephone according to a preferred embodiment of the present invention.

FIG. 4 is a block diagram of a touch screen based telephone 402 according to a preferred embodiment of the present invention. The telephone 402 includes a processor 406, such as a central processing unit (CPU), that is connected to a communication medium, such as a bus 404. The processor 406 operates in accordance with control logic 410 stored in a memory device 408, such as a random access memory (RAM), which is also connected to the bus 404. Preferably, control logic 410 represents a software program, such that the processor 406 operates in accordance with instructions in the software program.

The telephone 402 also includes application specific components 420, which preferably include telephone related components. More particularly, the application specific components 420 include telephony communication components that are necessary to enable the telephone 402 to establish and maintain communication links over a telephone line. The structure and operation of such telephony communication components will be apparent to persons skilled in the relevant art.

A hierarchical repertory or database 412 is stored in the RAM 408. The hierarchical repertory 412 may be implemented using any well known and appropriate data structure, such as a linked list data structure.

User data is preferably stored in the repertory 412. More particularly, in the preferred embodiment of the present invention, user-provided telephone numbers are stored in the repertory 412. The processor 406 in accordance with the control logic 410 enables users to manipulate data in the repertory 412 (that is, to add data to the repertory 412, view and/or modify data in the repertory 412, delete data in the repertory, etc.). Users are provided access to data in the repertory 412 via a touch screen module 414.

The touch screen module 414 includes a display or monitor 416 having a screen 417 that is divided into a plurality of sectors. A unique digital code is assigned to each of the sectors. A touch screen interface 418, which is also part of the touch screen module 414, monitors the screen 417 and detects when the screen 417 is touched. When a user touches the screen 417, the touch screen interface 418 determines which sector of the screen 417 was touched, and then sends the digital code associated with that sector to the processor 406 via the bus 404. In this manner, the processor 406 is made aware of any and all sectors of the screen 417 which are touched. Touch screen technology is well known and, thus, the structure and operation of the touch screen module 414 will be apparent to persons skilled in the relevant art.

The telephone 402 maintains a number of display pages (such as those shown in FIGS. 1 and 2), which are graphical images that are displayed on the screen 417. These display pages are stored in the RAM 408. Alternatively, these display pages are stored in memory (not shown) contained in the touch screen module 414, or are generated as needed using stored button-related information (size, position, etc.).

Each display page includes one or more icons that resemble buttons. Accordingly, these icons are called "touch screen buttons", or simply "buttons". The buttons are arranged on the display pages such that when a display page is displayed on the screen 417, each button is positioned over a unique set of the sectors of the screen 417. That is, no two buttons (of a display page displayed on the screen 417) are positioned over the same sector of the screen 417.

Preferably, a number of the display pages maintained by the telephone 402 are used to enable users to access data in the hierarchical repertory 412. Such display pages are herein called "repertory display pages".

These repertory display pages each include one or more "fast dial" buttons. As discussed above, the "fast dial" buttons map to nodes in the hierarchical repertory 412. More particularly, each fast dial button is linked to a node in the hierarchical repertory 412. Additionally, each fast dial button has a label that identifies the node to which it is linked.

The general operation of the telephone 402 shall now be described by way of an example. Suppose that the display page 102 of FIG. 1 is displayed on the screen 417, and that the repertory 412 in the RAM 408 is identical to the hierarchical repertory 301 in FIG. 3. Also suppose that the user presses the "family" button 104, which is linked to the "family" node in the first level 302 of the repertory 301.

The touch screen interface 418 detects the pressing of the family button 104, and sends the digital code(s) corresponding to the screen sectors coincident with the family button 104 to the processor 406 via the bus. The processor 406 identifies that these digital code(s) correspond to the family button 104 (the processor 406 may access, for example, a table maintained in the RAM 408 which correlates digital code(s) to buttons in the display pages).

The processor 406, operating in accordance with control logic 410, determines that the family button 104 is associated with the family node in the repertory 301. Since the family node is a parent node, the processor 406 causes the display page 202 to be displayed on the screen 417 (if, instead, the family node was a non-parent node, then the processor 406 would instruct the application specific components 420 to dial the telephone number associated with the family node). The fast dial buttons 204 in the display page 202 are linked to the child nodes of the family node.

According to the present invention, the telephone 402 automatically expands the hierarchical repertory 412 to accommodate a user request to add an entry (such as a telephone number button) to a full touch screen display page, such as the display page 202 in FIG. 2. Preferably, this task is automatically performed by the processor 406 operating in accordance with the control logic 410. Alternatively, the telephone 402 is made to perform this task using hardware components only, such as a hardware implemented state machine.

Figure 5A:
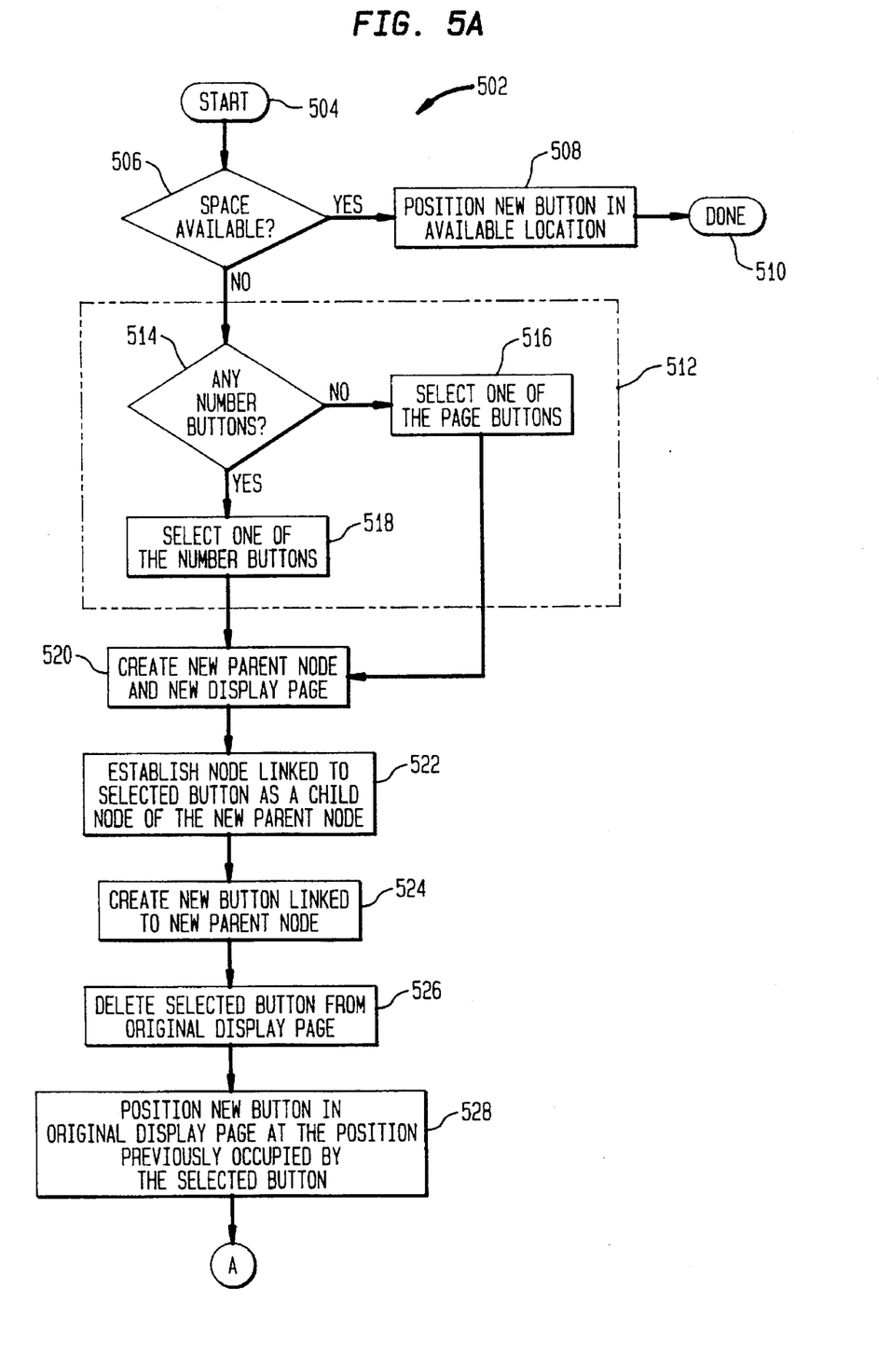
FIGS. 5A and 5B illustrate a flowchart representing the operation of the present invention according to a preferred embodiment.

The manner in which the telephone 402 automatically expands the hierarchical repertory 412 shall now be described with reference to a flowchart 502 presented in FIGS. 5A and 5B. The flowchart 502 is of sufficient detail to enable a person skilled in the relevant art to generate relevant portions of the control logic 410, or to generate a comparable hardware implemented state machine. The steps of flowchart 502 are automatically performed by the processor 406 in response to a user request to add a new telephone number button to a display page. For reference purposes, this display page is called the "current display page", and represents the display page that is currently displayed on the screen 417 when the user makes her request.

It is important to note that the processor 406 automatically performs the steps of flowchart 502. The user is not required to perform any of the steps of flowchart 502. The operations performed by the processor 406 are transparent to the user.

The flowchart 502 begins with step 504, where control immediately passes to step 506.

In step 506, the processor 406 determines whether there are any available spaces for new telephone number buttons in the current display page. If a space for a new telephone number button is available, then step 508 is performed. In step 508, the processor 406 creates a new node and adds the new node to the hierarchical repertory 412, associates a telephone number with this new node (the telephone number is entered by the user), creates a new telephone number button, links this new telephone number button to the new node, and automatically positions the new telephone number button in an available space of the current display page. Alternatively, the processor 406 displays (in outline form) all available spaces in the current display page for the new button and allows the user to select one of the available spaces. The new button is then positioned in the space that the user selected. The manner in which new nodes are created and added to the repertory 412 will be apparent to persons skilled in the relevant art. For example, a node may be created by instantiating a new instance of a node structure, and the node may be added to the repertory by linking the node to the linked list. Operation of the processor 406 according to the flowchart 502 is complete after processing step 508, as indicated by step 510.

If, in step 506, the processor 406 determined that there were no available spaces in the current display page (in other words, the processor 406 determined that the current display page was full), then the processor 406 performs step 512, which comprises sub-steps 514, 516, and 518. In step 512, the processor 406 selects one of the existing fast dial buttons in the current display page. Recall that there are two types of fast dial buttons: telephone number buttons and menu buttons. Preferably, the processor 406 selects a telephone number button, if one is available. The processor 406 only selects a menu button if there are no telephone number buttons available. By using this selection strategy, there is a greater chance that the user's desired organization of the hierarchical repertory 412 will be satisfied. Step 512 shall now be described in greater detail.

In step 514, the processor 406 determines whether there are any telephone number buttons in the current display page (The processor 406 visits the buttons in the current display page in a predetermined order to ensure predictable and consistent operation from a user's point of view. Preferably, the processor 406 starts with the lower right button and works across each row of buttons. Alternatively, other predetermined schemes for visiting buttons may be used.). If there are one or more telephone number buttons in the current display page, then the processor 406 in step 518 selects one of the telephone number buttons from the current display page. Otherwise, the processor 406 in step 516 selects one of the menu buttons from the current display page (again, the processor 406 visits the buttons in the current display page in a predetermined order, as described above).

After a fast dial button has been selected from the current display page in step 512, the processor 406 performs step 520. In step 520, the processor 406 creates a new parent node and adds the new parent node to the hierarchical repertory 412. The new parent node has the same parent node as the node associated with the selected fast dial button.

Figure 6A:
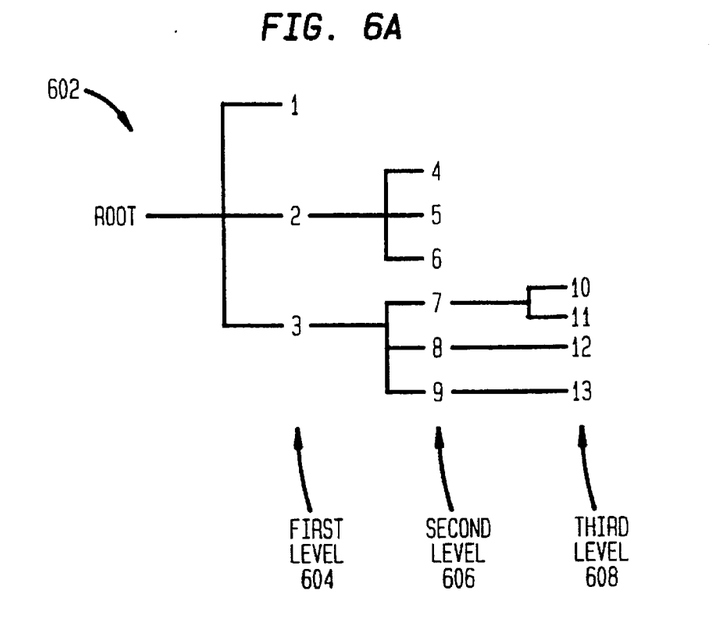
FIGS. 6A–6C illustrate an example hierarchical repertory used to illustrate the operation of the present invention.

For illustrative purposes, assume that the hierarchical repertory 412 is identical to a hierarchical repertory 602 shown in FIG. 6A. Also assume that each parent node in the hierarchical repertory 602 may have a maximum of three child nodes (such that each display page may have a maximum of three fast dial buttons). Further assume that the current display page corresponds to child nodes 4, 5, 6 of parent node 2, and that node 4 is linked to the fast dial button selected in step 512. Note that node 4 is a telephone number node (since it does not have any child nodes). The performance of step 520 operates to create a new parent node "M", and to add this new parent node "M" to the hierarchical repertory 602. See FIG. 6B. The new parent node "M" has the same parent node (that is, node 2) as the node (that is, node 4) associated with the selected fast dial button.

Now assume that the current display page corresponds to child nodes 7, 8, 9 of parent node 3, and that node 7 is linked to the fast dial button selected in step 512. Note that node 7 is a menu node (since it has child nodes). The performance of step 520 operates to create a new parent node "X", and to add this new parent node "X" to the hierarchical repertory 602. See FIG. 6C. The new parent node "X" has the same parent node (that is, node 3) as the node (that is, node 7) associated with the selected fast dial button.

Also in step 520, the processor 406 generates a new display page. Ultimately, this new display page will include fast dial buttons linked to the child nodes of the new parent node (that is, node "M" or node "X" in the examples of FIGS. 6B and 6C).

Figure 6B:
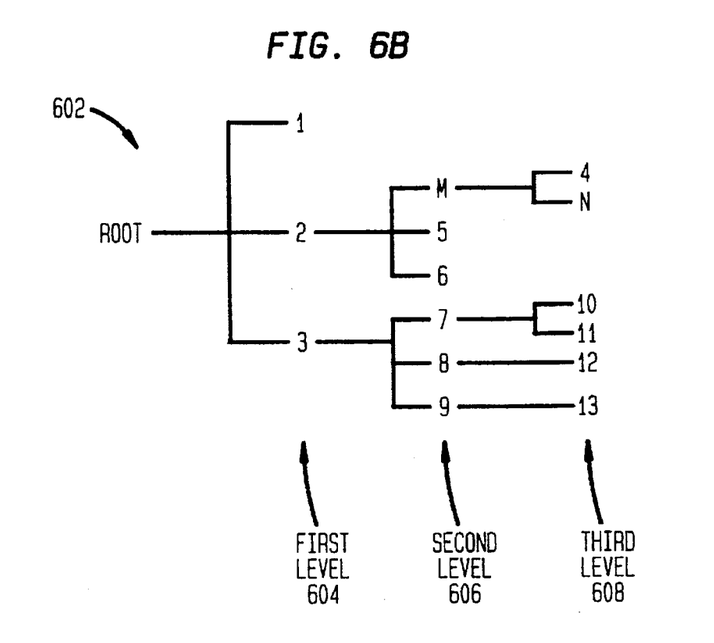

Returning to FIG. 5A, in step 522 the processor 406 modifies the hierarchical repertory 412 to establish the node linked to the selected fast dial button as a child node of the new parent node (thus, upon completion of step 522, this node is no longer linked to the selected fast dial button). For example, referring to the repertory 602 presented in FIG. 6A (assuming again that repertory 412 is identical to repertory 602), consider the case where node 4 is linked to the fast dial button selected in step 512. In this case, node 4 is established as a child node of the new parent node "M". This is shown in FIG. 6B.

Figure 6C:
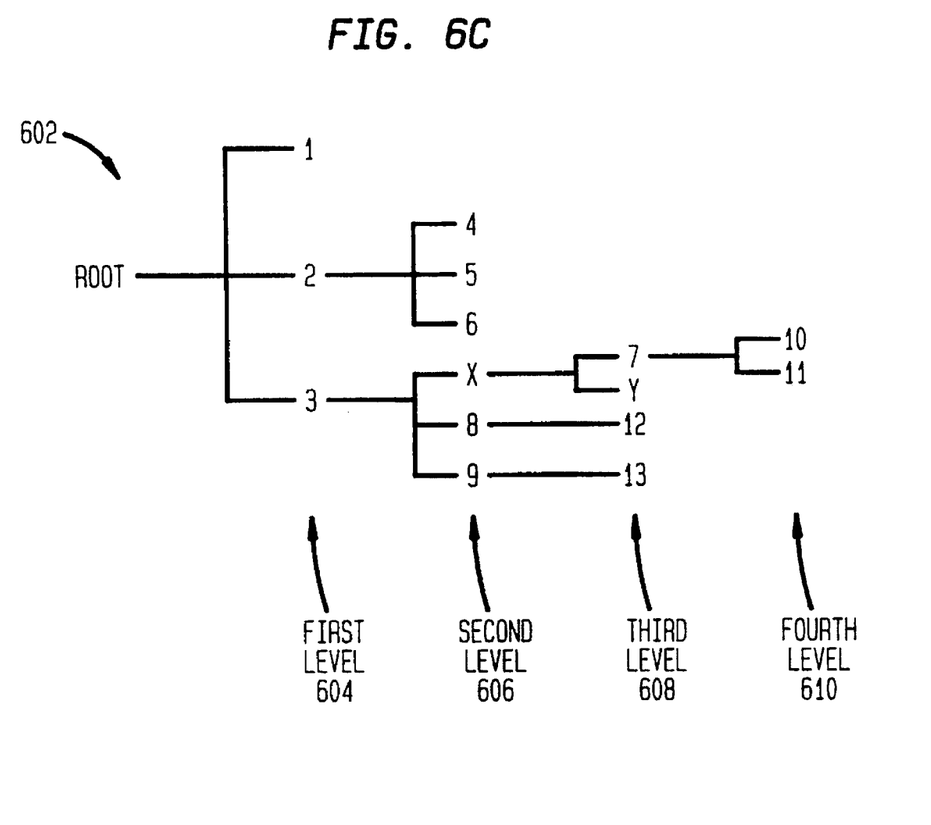

Now consider the case where node 7 is linked to the fast dial button selected in step 512. In this case, node 7 is established as a child node of the new parent node "X". This is shown in FIG. 6C. Note that the structure of node 7 is the same. That is, node 7 remains the parent node of child nodes 10 and 11. Returning to FIG. 5A, in step 524 the processor 406 creates a new menu button and links this new menu button to the new parent node.

In step 526, the processor 406 deletes from the current display page the fast dial button selected in step 512. Upon the completion of step 526, the current display page is no longer full. Instead, it has space for one new fast dial button.

In step 528, the processor 406 positions the new menu button (created in step 524) in the current display page at the position previously occupied by the selected fast dial button (that was deleted in step 526). Upon the completion of step 528, the current display page is once again full.

Figure 5B:
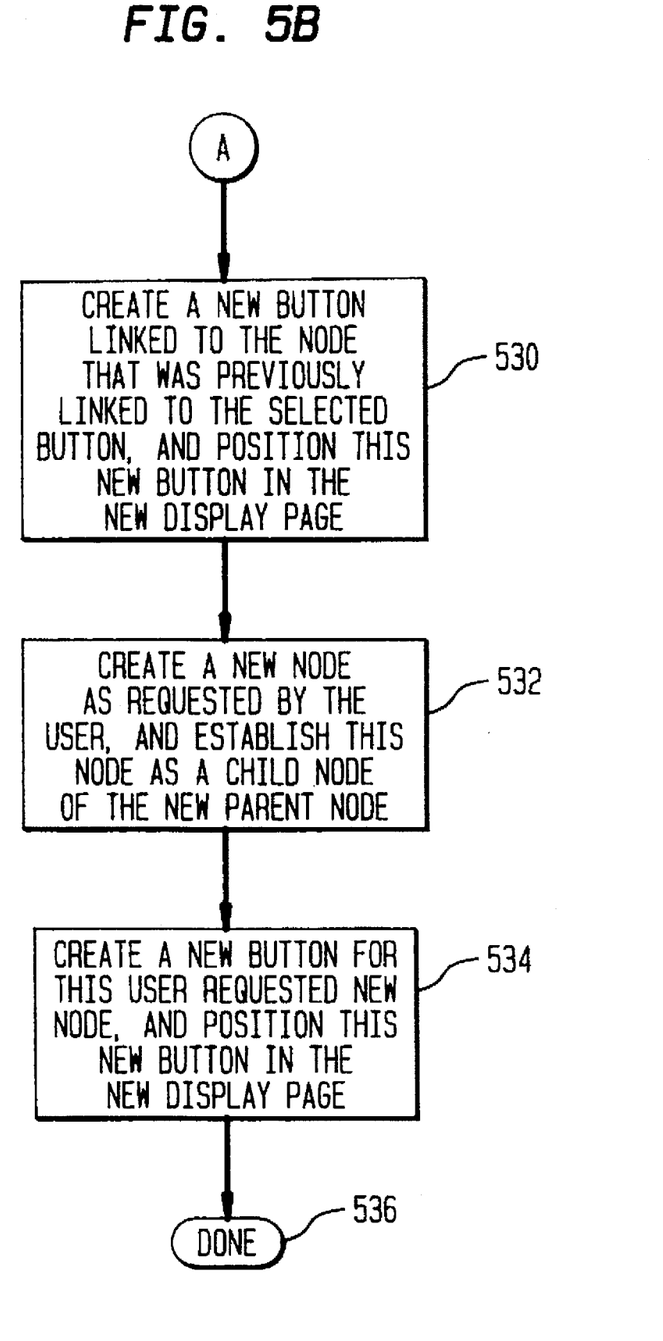

Referring now to FIG. 5B, in step 530 the processor 406 creates a new fast dial button and links this new fast dial button to the node that was previously linked to the selected button (recall that by operation of step 522 this node is now a child node of the new parent node). This new fast dial button is positioned in the new display page (that was created in step 520). For example, referring to the repertory 602 presented in FIG. 6A (assuming again that repertory 412 is identical to repertory 602), consider the case where node 4 in step 522 was established as a child node of the new parent node "M" (see FIG. 6B). In step 530, a new fast dial button is created and linked to node 4, and this new fast dial button is positioned in the new display page (created in step 520) that contains all of the fast dial buttons linked to the child nodes of the new parent node "M".

Now consider the case where node 7 in step 522 was established as a child node of the new parent node "X" (see FIG. 6C). In step 530, a new fast dial button is created and linked to node 7, and this new fast dial button is positioned in the new display page (created in step 520) that contains all of the fast dial buttons linked to the child nodes of the new parent node "X".

Returning to FIG. 5B, in step 532 the processor 406 creates a new telephone number node and associates with this new node a telephone number provided by the user. This new node represents the telephone number node which the user wanted to create when she originally pressed the "create new telephone number button" button in the current display page. The processor 406 establishes this new telephone number node as a child node of the new parent node (created in step 520).

For example, referring to the repertory 602 presented in FIG. 6A (assuming again that repertory 412 is identical to repertory 602), consider the case where the new parent node "M" was added in step 520 (see FIG. 6B). In step 532 a new telephone number node "N" is created and established as a child node of the new parent node "M".

Now consider the case where the new parent node "X" was added in step 520 (see FIG. 6C). In step 532 a new telephone number node "Y" is created and established as a child node of the new parent node "X".

Returning to FIG. 5B, in step 534 the processor 406 creates a new telephone number button and links this new button to the new telephone number node created in step 532. Then, the processor 406 positions this new telephone number button in the new display page (created in step 520). Processing of flowchart 502 is complete after step 534 is performed, as indicated by step 536.

Accordingly, the present invention represents a system and method for automatically expanding a hierarchical repertory that is maintained by a touch screen based product to accommodate a user request to add an entry to a full touch screen display page. Such expansion occurs automatically without any user interaction. Thus, expansion of the repertory is not laborious from a user's point of view. Also, such expansion results in a hierarchical repertory that is arranged in a way that is consistent with the user's desired organization of the repertory.

While various embodiments of the present invention have been described above, it should be understood that they have been presented by way of example only, and not limitation. For example, the procedure discussed above may also be used to implement an "Add a New Display Page" feature (in other words, the new button being added does not have to be a telephone number button). Implementation of this "Add a New Display Page" feature will be apparent to persons skilled in the relevant art based on the discussion contained above. Thus, the breadth and scope of the present invention should not be limited by any of the above-described exemplary embodiments, but should be defined only in accordance with the following claims and their equivalents.

What is claimed is:

1. A method of automatically expanding a hierarchical repertory that is maintained by a touch screen based product to accommodate a user request to add an entry to a selected one of at least one touch screen display page, the selected touch screen display having reached its capacity of entries, comprising the steps of:
   (1) automatically selecting a button from the selected display page based on a predetermined selection scheme, said selected button being linked to a first node of the repertory;
   (2) automatically adding a second node to the repertory;
   (3) automatically modifying said repertory to establish said first node as a child node of said second node;
   (4) automatically associating a first new menu button with said second node;
   (5) automatically deleting from the selected display page said selected button; and
   (6) automatically positioning said first new menu button in the selected display page at a position previously occupied by said selected button.

2. The method of claim 1, further comprising the steps of:
   automatically creating a new display page;
   automatically associating one of a second new menu button with said first node if said first node has at least one child node, and a new data button with said first node if said first node does not have at least one child node; and
   automatically positioning said one of said second new menu button and said new data button in said new display page.

3. The method of claim 2, further comprising the steps of:
   automatically creating a third node;
   automatically associating user-provided data with said third node;
   automatically modifying said repertory to establish said third node as a child node of said second node;
   automatically associating a new data button with said third node; and
   automatically positioning said new data button in said new display page.

4. The method of claim 1, wherein the predetermined selection scheme comprises the steps of:
   automatically determining whether any buttons associated with a node with no child node exist in the selected display page;

automatically selecting a button associated with a node with no child node from the selected display page if one is determined to exist as the selected button; and automatically selecting a menu button from the display page if a button associated with a node with no child node is determined not to exist in the display page as the selected button.

5. A touch screen based system, comprising:

a memory device;

a database stored in said memory device, said database comprising user data that is hierarchically organized;

a processor coupled to said memory device; and control logic to enable said processor to automatically expand said database in response to a user request to add an entry to a selected touch screen display page that includes at least one menu button and that has reached its capacity of entries, said control logic comprising:

button selecting means for enabling said processor to automatically select a button based on a predetermined selection scheme, from the selected display page, said selected button being linked to a first node of the database;

means for enabling said processor to automatically add a second node to the database;

means for enabling said processor to automatically modify said database to establish said first node as a child node of said second node;

means for enabling said processor to automatically associate a first new menu button with said second node;

means for enabling said processor to automatically delete from the selected display page said selected button; and means for enabling said processor to automatically position said first new menu button in the selected display page at a position previously occupied by said selected button.

6. The system of claim 5 wherein said control logic further comprises:

means for enabling said processor to automatically create a new display page;

means for enabling said processor to automatically associate one of a second new menu button with said first node if said first node has at least one child node, and a new data button with said first node if said first node does not have at least one child node; and means for enabling said processor to automatically position said one of said second new menu button and said new data button in said new display page.

7. The system of claim 6, wherein said control logic further comprises:

means for enabling said processor to automatically create a third node;

means for enabling said processor to automatically associate user-provided data with said third node;

means for enabling said processor to automatically modify said repertory to establish said third node as a child node of said second node;

means for enabling said processor to automatically associate a new data button with said third node; and means for enabling said processor to automatically position said new data button in said new display page.

8. The system of claim 5, wherein said button selecting means comprises:

means for enabling said processor to automatically determine whether any data buttons exist in the display page;

means for enabling said processor to automatically select a data button from the display page if one is determined to exist; and means for enabling said processor to automatically select a menu button from the display page if a data button is determined to not exist in the display page.

9. The system of claim 5, wherein said touch screen based system is a touch screen based telephone, and wherein said database is a repertory of user-provided telephone numbers.

10. A system of automatically expanding a hierarchical repertory that is maintained by a touch screen based product to accommodate a user request to add an entry to a selected touch screen display page that has reached its capacity of entries, comprising:

button selecting means for automatically selecting a button based on a predetermined selection scheme from the selected display page, said selected button being linked to a first node of the repertory;

means for automatically adding a second node to the repertory;

means for automatically modifying said repertory to establish said first node as a child node of said second node;

means for automatically associating a new menu button with said second node;

means for automatically deleting from the selected display page said selected button; and means for automatically positioning said new menu button in the selected display page at a position previously occupied by said selected button.

11. The system of claim 10 further comprising:

means for automatically creating a new display page;

means for automatically associating one of a second new menu button with said first node if said first node has at least one child node, and a new data button with said first node if said first node does not have at least one child node; and means for automatically positioning said one of said second new menu button and said new data button in said new display page.

12. The system of claim 11, further comprising:

means for automatically creating a third node;

means for automatically associating user-provided data with said third node;

means for automatically modifying said repertory to establish said third node as a child node of said second node;

means for automatically associating a new data button with said third node; and means for automatically positioning said new data button in said new display page.

13. The system of claim 10, wherein said button selecting means comprises:

means for automatically determining whether any buttons associated with nodes with no child nodes exist in the display page;

means for automatically selecting a button associated with a node with no child node from the display page if one is determined to exist; and means for automatically selecting a menu button associated with a node with no child node from the display page if one is determined to exist; and means for automatically selecting a menu button from the display page if a button associated with a node with no child node is determined to not exist in the display page.

* * * * *